(12) United States Patent
Ahmadi et al.

(10) Patent No.: US 12,217,277 B2
(45) Date of Patent: Feb. 4, 2025

(54) SYSTEM AND METHOD FOR IN-STORE CUSTOMER FEEDBACK COLLECTION AND UTILIZATION

(71) Applicant: Blue Boat Data Inc, New York, NY (US)

(72) Inventors: Hamed Ahmadi, Burnaby (CA); Parinaz Vahabzadeh, Albany, NY (US)

(73) Assignee: Blue Boat Data Inc, New York, NY (US)

( * ) Notice: Subject to any disclaimer, the term of this patent is extended or adjusted under 35 U.S.C. 154(b) by 0 days.

(21) Appl. No.: 17/672,790

(22) Filed: Feb. 16, 2022

(65) Prior Publication Data

US 2022/0405781 A1  Dec. 22, 2022

Related U.S. Application Data

(60) Provisional application No. 63/212,123, filed on Jun. 18, 2021.

(51) Int. Cl.
*G06Q 30/0203* (2023.01)
*G06Q 30/0242* (2023.01)
*G06Q 30/0251* (2023.01)

(52) U.S. Cl.
CPC ..... *G06Q 30/0203* (2013.01); *G06Q 30/0244* (2013.01); *G06Q 30/0268* (2013.01)

(58) Field of Classification Search
None
See application file for complete search history.

(56) References Cited

U.S. PATENT DOCUMENTS

| | | | | |
|---|---|---|---|---|
| 5,194,271 A | * | 3/1993 | Yasosky | A21D 10/04 426/243 |
| 7,006,980 B1 | * | 2/2006 | Snyder | G06Q 40/02 705/37 |
| 8,818,838 B1 | * | 8/2014 | Sharma | G06Q 30/0202 705/7.29 |
| 8,838,469 B2 | * | 9/2014 | Bottom | G06Q 30/0204 705/7.29 |

(Continued)

OTHER PUBLICATIONS

Chen, Shu-Ching, and Pascale G. Quester. "A value-based perspective of market orientation and customer service." Journal of retailing and consumer services 16.3 (2009): 197-206 (Year: 2009).*

(Continued)

*Primary Examiner* — Darlene Garcia-Guerra
(74) *Attorney, Agent, or Firm* — Wolf, Greenfield & Sacks, P.C.

(57) ABSTRACT

A system for managing customer feedback regarding a product or service is disclosed, particularly, at a point-of-sale location. The system includes a backend system and a frontend system wherein feedback from a customer regarding the product or service is collected using the frontend system. The feedback is transmitted to the backend system where one or more sales or business hypothesis are generated to present to the customer to acquire further feedback from the customer. One or more action items, such as product offering optimization, marketing campaign customization, and inventory management can be suggested based on the customer response to the generated hypothesis.

18 Claims, 4 Drawing Sheets

(56) References Cited

U.S. PATENT DOCUMENTS

| | | | |
|---|---|---|---|
| 9,237,121 B1 | 1/2016 | Graham et al. | |
| 10,282,743 B2 | 5/2019 | Taylor et al. | |
| 10,366,174 B2 | 7/2019 | Cypher et al. | |
| 10,592,882 B1* | 3/2020 | Viswanath | G06Q 20/202 |
| 10,902,448 B2 | 1/2021 | Munjal | |
| 2002/0169658 A1* | 11/2002 | Adler | G06Q 10/06 |
| | | | 705/7.29 |
| 2003/0088458 A1* | 5/2003 | Afeyan | G06N 3/126 |
| | | | 706/13 |
| 2004/0059626 A1* | 3/2004 | Smallwood | G06Q 30/02 |
| | | | 705/7.29 |
| 2005/0043829 A1* | 2/2005 | Rossides | G07F 17/3255 |
| | | | 700/91 |
| 2005/0189414 A1* | 9/2005 | Fano | G06Q 30/02 |
| | | | 705/14.27 |
| 2006/0064339 A1* | 3/2006 | Allred | G06Q 30/02 |
| | | | 705/7.29 |
| 2007/0107836 A1* | 5/2007 | Gibberd | B65B 25/023 |
| | | | 156/244.11 |
| 2009/0018996 A1* | 1/2009 | Hunt | G06Q 30/02 |
| 2009/0164341 A1* | 6/2009 | Sunvold | G06F 3/04847 |
| | | | 715/764 |
| 2010/0169067 A1* | 7/2010 | Basel | G06Q 30/02 |
| | | | 703/21 |
| 2010/0174671 A1* | 7/2010 | Brooks | G06Q 30/02 |
| | | | 706/12 |
| 2010/0217650 A1* | 8/2010 | Hartnell | G06Q 30/0201 |
| | | | 705/7.29 |
| 2011/0191140 A1* | 8/2011 | Newman | G06Q 30/0202 |
| | | | 705/7.31 |
| 2011/0320224 A1* | 12/2011 | Sen | G06Q 40/08 |
| | | | 705/26.7 |
| 2013/0013374 A1* | 1/2013 | Smith | G06Q 40/02 |
| | | | 705/7.33 |
| 2013/0339270 A1 | 1/2013 | Singh | |
| 2014/0006158 A1 | 1/2014 | Cooper | |
| 2014/0231502 A1* | 8/2014 | Marsico | G06Q 30/0203 |
| | | | 235/375 |
| 2014/0330633 A1* | 11/2014 | Moran | G06T 3/0006 |
| | | | 705/14.43 |
| 2014/0365301 A1* | 12/2014 | Rappoport | G06Q 30/0253 |
| | | | 705/14.51 |
| 2015/0302436 A1* | 10/2015 | Reynolds | G06Q 10/06 |
| | | | 705/7.32 |
| 2017/0140007 A1* | 5/2017 | Agarwal | G06F 16/248 |
| 2017/0220943 A1* | 8/2017 | Duncan | G06N 5/04 |
| 2019/0034950 A1* | 1/2019 | Roux | G06Q 30/0282 |
| 2019/0180302 A1* | 6/2019 | Ventrice | G06Q 30/0211 |
| 2019/0205921 A1* | 7/2019 | Eichorn | G06Q 30/0246 |
| 2020/0013077 A1 | 1/2020 | Garlapati | |
| 2020/0074520 A1 | 3/2020 | Bermudez et al. | |
| 2021/0103945 A1* | 4/2021 | Montero | G06Q 30/0269 |
| 2021/0174148 A1* | 6/2021 | Raveh | G06V 10/82 |
| 2021/0200899 A1 | 7/2021 | Brannon et al. | |
| 2022/0092651 A1* | 3/2022 | Sureshkumar | G06Q 30/0282 |

OTHER PUBLICATIONS

Olsson, Helena Holmström, and Jan Bosch. "From requirements to continuous re-prioritization of hypotheses." Proceedings of the International Workshop on Continuous Software Evolution and Delivery. 2016 (Year: 2016).*

Wu, Jianlin, Ning Zhu, and Qi Dai. "Consumer ethnocentrism, product attitudes and purchase intentions of domestic products in China." EBM, Chengdu, China 2262 (2010): 2265. (Year: 2010).*

Ennis, Daniel M., and John M. Ennis. "Equivalence hypothesis testing." Food Quality and Preference 21.3 (2010): 253-256 (Year: 2010).*

Sands, Sean, Harmen Oppewal, and Michael Beverland. "The effects of in-store themed events on consumer store choice decisions." Journal of Retailing and Consumer services 16.5 (2009): 386-395 (Year: 2009).*

* cited by examiner

Sign in

Logo

Username
Password

Forgot password?
Register

Fig. 3A

Sign up

Logo

Username
Password
Other fields

Already a member?

Fig. 3B

User (Role Salesperson)

Profile
Find product
Submit feedback

Fig. 3C

User (Role Admin)

Manage users
Manage roles
Manage actions
Manage products
Manage product attributes
Manage feedbacks

Fig. 3G ion with the accompanying figures.
SYSTEM AND METHOD FOR IN-STORE CUSTOMER FEEDBACK COLLECTION AND UTILIZATION

TECHNICAL FIELD

The present disclosure relates generally to collecting and utilizing customer feedback and more particularly relates to in-store customer feedback collection and utilization.

BACKGROUND

Customer feedback has become one of the primary drivers of long-term growth. Present day organizations jump at every opportunity to talk to customers or learn about them. Businesses are spending millions of dollars on setting up feedback channels: emails, reviews, surveys, website analytics. However, there's still a great source of feedback that's not being captured efficiently and that's the conversations among customers and salespersons in an organization's store or point-of-sale. The key impediment to employing this valuable source of data is that direct-to-consumer (DTC) companies could have hundreds of stores each filled up with thousands of products and tens of salespersons. This disclosure tackles this issue by offering a system including both software and hardware components to facilitate in-store feedback collection, storage, retrieval, and analysis in an efficient semi to fully automatic way.

SUMMARY

A system for managing customer feedback regarding a product or service at a point-of-sale location is provided. The system includes a backend system comprising a processor and a data system, the data system configured to store data related to plurality of products or services. The system also includes a frontend system communicatively connected to the backend system and configured to collect customer feedback data from the customer regarding the product or service and transmit the collected data to the backend system. wherein the backend system is configured to: in response to receiving the customer feedback data, calculate one or more hypotheses and transmits the one or more calculated hypotheses to the frontend system to be presented to the customer; and determine, based at least on the response of the customer to the one or more hypotheses, an action to be taken.

The action to be taken comprises one or more of: optimizing offerings related to the product or service; generating insight reports about the product or service; optimizing marketing efforts related to the product or service; optimizing affinity models related to the product or service; and optimizing inventory management tasks related to the product or service.

The backend system may further comprise a marketing campaign system, an inventory system, a supply chain system, and a customer loyalty system. The data system may further include a customer database and a customer transaction database.

The frontend system may be further configured to transmit a customer identifier to the backend system and thereby causing the backend system to associate the customer feedback with the customer identifier.

Moreover, a method for customer feedback management is provided. The method includes collecting a first feedback from a customer regarding a target product or service, at a point-of-sale location; utilizing, by a computer processor, the received feedback to generate a hypothesis indicative of a question regarding the target product or service; presenting the hypothesis to the customer and asking customer to provide a second feedback regarding the hypothesis; and utilizing, by the computer processor, the first and second feedback to generate intelligence and insight related to the target product or service, or relevant products or services.

The method may further comprise utilizing, by the computer processor, the first and second feedback to optimize offerings at the point-of-sale location; and providing, by the computer processor, updates on the optimized offerings to the customer regarding the target product or service.

Other aspects and features will become apparent to those ordinarily skilled in the art upon review of the following description of specific disclosed embodiments in conjunction with the accompanying figures.

BRIEF DESCRIPTION OF THE DRAWINGS

In the following, embodiments of the present disclosure will be described with reference to the appended drawings. However, various embodiments of the present disclosure are not limited to the arrangements shown in the drawings.

DETAILED DESCRIPTION

Figure 1:
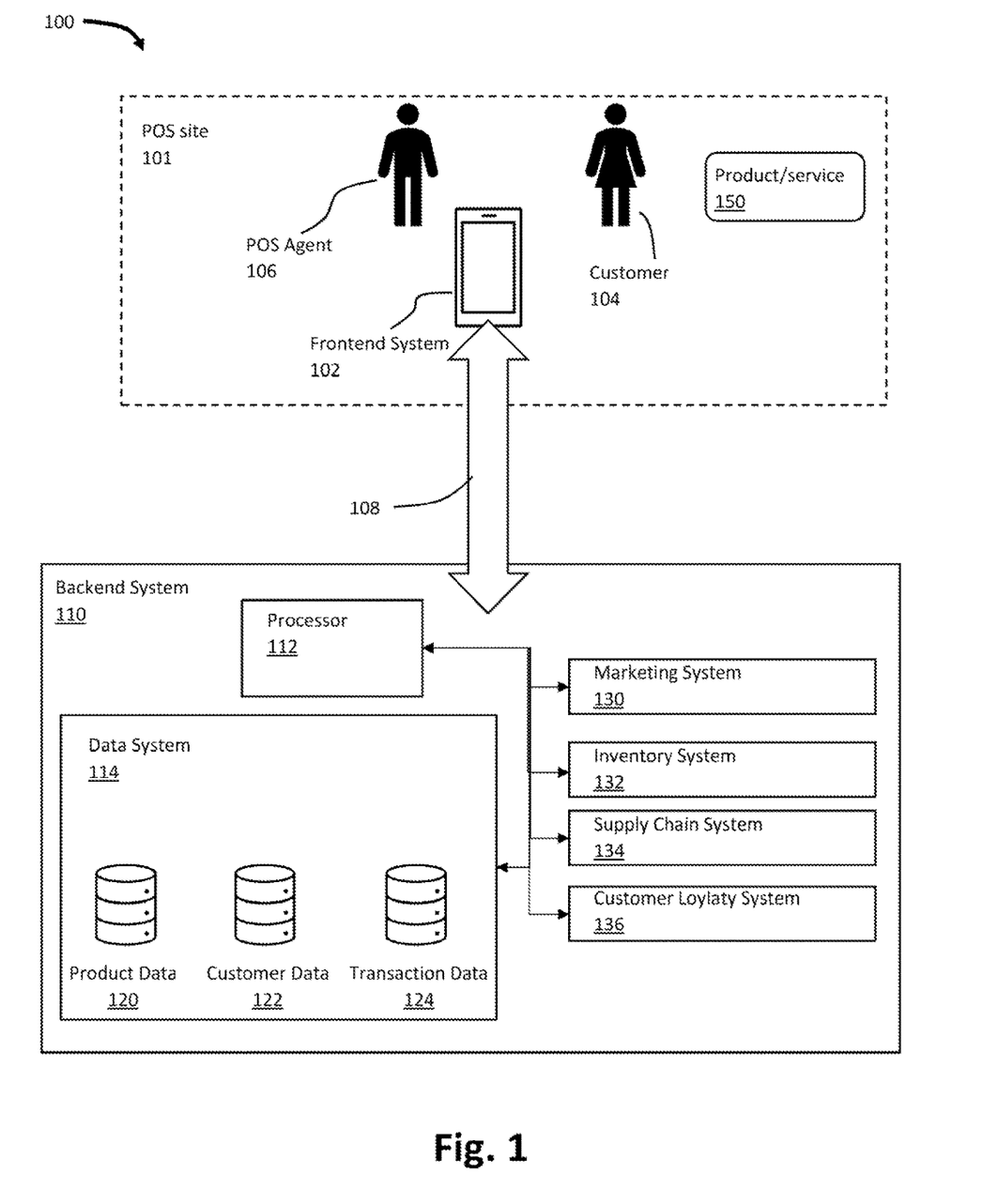
FIG. 1 is a block diagram showing a system for customer feedback management according to a first embodiment.

Referring to FIG. 1, a system for customer feedback management is generally shown at 100, according to an embodiment. The system 100 includes a frontend system 102, such as a mobile device, and a backend system 110, such as a local or cloud server. The frontend and backend systems 102 and 110 are communicatively connected together using a communication channel 108, such as wired or wireless network channel. Using the system 100, a customer 104 may provide information or feedback regarding one or more products or services 150 at a point of sale (POS) site 101. The customer's info or feedback may be inserted into the frontend system 102 by a POS agent 106 such as a sales associate or a store representative. The system 100 is configured to receive the customer 104 feedback on a target product or service 150 using the frontend system 102, aggregate and process the feedback in the backend system 110, and use the processed data in the backend system 110 to calculate an action or a course of actions in response to the received customer feedback. The examples of the calculated actions include:

generating a hypothesis regarding the target product or service 150, or another product or service closely related to the product or service 150, and presenting the hypothesis to the customer 104 so that the customer 104 could provide further feedback or information;

Generating a questionnaire for the POS agent 106, such that the questionnaire can guide the POS agent 106 to survey the customer 104 regarding the target product or service 150, or another product or service closely related to the product or service 150;

generating an inventory management task for the POS site to make available a missing product or service;

generating a new product or service recommendation to a product manufacturer or a service provider; and The purposes of the calculated actions in the system 100 are primarily to address missing sales opportunities, facilitating up-selling and cross-selling efforts, and understanding customers' needs such as preference shift detection.

The calculated actions may be pre-determined (preprogrammed) or may be automatically generated using artificial intelligence techniques such as machine learning and big data techniques. As an instance for a pre-determined action, in case a product team needs to choose a suitable color (or any other product attribute) among multiple options, the system could guide the POS agent 106 to survey the customer 104 on this matter. An example for an automatically generated action is that the system 100 can use machine learning algorithms to find out if the product arrangement in the store matches their current demand based on customer feedback, and then accordingly guides a store manger or the POS agent, for example, to change the store arrangement.

The POS site 101 may be a physical location for presenting products and/or services. For example, the POS site may be a retail store, such as apparel or grocery store, where customers can physically browse and purchase products and goods. Other examples of a POS site include a service provider location, such as a medical clinic, where customers are provided with various services.

The customer 104 may provide feedback related to one or more existing or missing attributes of the target product or service 150 or may provide feedback related to another product or service associated with the product or service 150.

The backend system 110, includes a processor 112 such as a computer or microcontroller configured to perform processing operations related to the received feedback from the customer, and a data system 114 configured to store and analyze data. The data system 114 may further include one or more databases. In the embodiment shown in FIG. 1, the data system 114, includes a Product database 120, a customer database 122, and a transaction database 124 containing data related to historic transactions on a particular product, customer, or POS site, for example. In addition to the data system 114, the processor may be connected to other sources of intelligence such as a marketing system 130, an inventory system 132, a supply chain system 134, and a loyalty system 136 to calculate the action or course of actions. The marketing system 130 may contain marketing information related to the POS site 101 or the product/service 150 such as the marketing promotions or campaigns set by the product managers of the product/service 150 for example. The inventory system 130 may contain information about the inventory of the POS site 101 or the inventory of the product/service 150 in the POS site or other sites. The supply chain system 134 may contain information regarding the supply chain or logistics of the product/service 150. The loyalty system 136 may contain information on loyalty programs of the POS site or loyalty programs related to the product/service 150.

The frontend system 102 may be a handheld device such as a smartphone or a tablet which includes an input device, such as a touch screen or keyboard, a display unit, such as an LCD, a communication module, such as a WiFi or cellular module to provide communication with the backend system 110, and a software application to facilitate communicating information between the backend system 110, the customer 104, and POS agent 106.

In some embodiments, the Customer 104 may provide feedback by directly interacting with the frontend system 102 and without the need to a POS agent 106. In such cases, the frontend system may be a user interface device located in a POS site or may be the customer's smartphone or tablet. If the customer 104 is using their own frontend device, the frontend system may include a software application which is installed on the customer's device and the customer can use the software application as a portal to interact with the backend system 110 for providing their feedback. In some embodiments, the frontend system 102 may be a touch screen user interface installed in fitting rooms of an apparel POS, for example. The customer 104 may provide its feedback regarding various attributes of a product through the touch screen user interface as they are trying the product.

Figure 2:
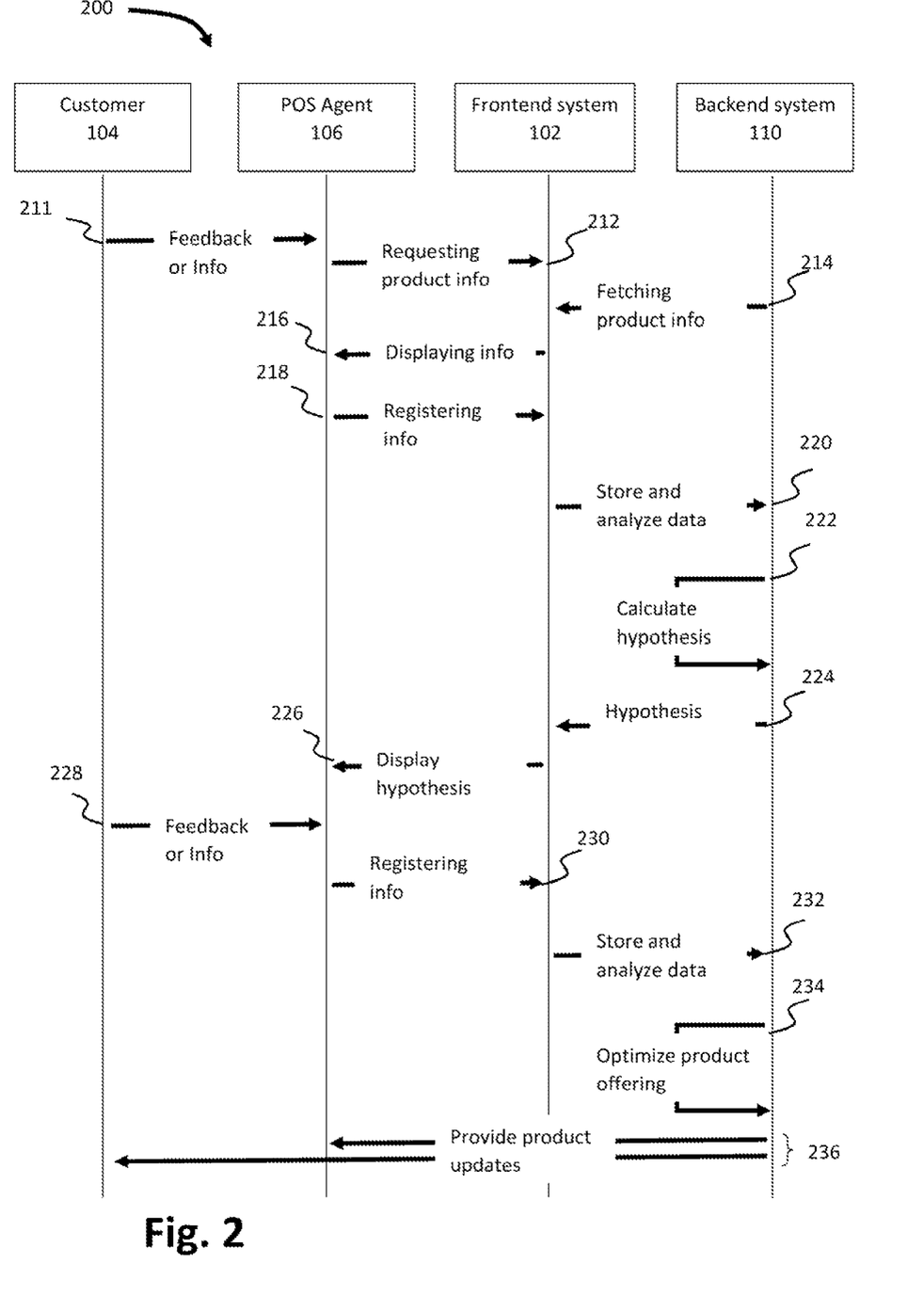
FIG. 2 is a schematic view of an information and process flow of the feedback management system of FIG. 1, according to an embodiment.

Referring to FIG. 2, a data flow diagram showing an embodiment of a method 200 for customer feedback management is presented. The method 200 may be implemented by the system 100 of FIG. 1. Method 200 shows data flow between the customer 104, the POS agent 106, the frontend system 102, and the backend system 110. The frontend system 102 and the backend system 110 are communicatively connected to each other via a network or a communication channel.

At 211, the customer 104 provides feedback or information to the POS agent 106 regarding a target product or service (not shown in FIG. 2). For example, the customer 104 may ask the POS agent 106 if a particular shirt (target product) comes in smaller sizes (product attribute) as well. The communication between the customer 104 and POS agent 106 may be verbally, in written, or through a digital user interface, for example.

At 212, the agent 106 inserts meta information of the target product or service (not shown in FIG. 2) in the frontend system and requests further information. The POS agent 106 may insert the product or service information by scanning a barcode, RFID tag, or QR code of the product, searching the name or identifier number of the product or service in the frontend system 102, or any other method. In some embodiments, the POS agent 106 may also insert information other than the product or service information. For example, the POS agent 106 may also insert the POS site information, such as a branch number, the agent 106 information, such as agent's ID number, and customer information, for example, by scanning the customer's loyalty card. In cases that the customer information is also inserted, it may be checked with the customer 104 to provide a consent for using and/or storing data associated with them, either anonymized or otherwise.

At 214, the frontend system 102 fetches the product or service information from the backend system 110.

At 216, the frontend system 102 displays the retrieved data to the POS agent 106.

At 218, the POS agent 106 may register the customer provided feedback and information on the frontend system 102. The agent 106 may register the feedback and information in a structured manner which is instructed by the frontend system. For example, the agent 106 may only register a quality of the received feedback by indicating if the feedback is positive, negative, or neutral for example. Examples of such feedback registries include:

Positive feedback: if the handbag (the product) came in blue (product attribute), the customer would have bought (a positive action) it;

Negative feedback: if the handbag (the product) didn't have (negative action) a logo (product attribute), the customer would have bought it; and Neutral example: what scarf goes well (product attribute) with this handbag (the product).

These feedbacks may be summarized in a structured way to make it easier for the POS agent 106 to register the information in less time, and also later for the backend to process and aggregate the information. For the mentioned examples, the following structured data entry may be used respectively:

handbag, like, color, blue
handbag, dislike, has-logo, true
handbag, match, scarf At 220, the frontend system 102 communicates the registered data with the backend system 110 for further data storage and data analyzing.

At 222, the backend system 110, processes the provided customer feedback and related data to calculate a course of action using the backend's processor 112 (as shown in FIG. 1). In the embodiment shown in FIG. 2, at this stage, the backend system 110 calculates one or more hypotheses. The hypotheses may be generated by analyzing the customer's feedback, the data from the data system 114 (as shown in FIG. 1), and other sources of intelligence available to the backend such as a Marketing system 130 (as shown in FIG. 1) which includes intelligence related to promotional marketing materials regarding the target product or service, or closely associated products or services. For example, the processor may generate the following hypotheses: If the handbag (the product) came in leather (product attribute), there is 80% chance the customer would buy it.

The hypothesis generated by the backend system 110 may be about the target product or service, or any other product or service that the backend systems 110 calculates that the customer's feedback may be helpful.

At 224, the one or more calculated hypothesis, or the calculated actions in general, are transmitted to the frontend system 102, the calculated hypothesis may be translated to actionable and easy to understand instructions. For example, the mentioned exemplary hypothesis may be translated to an instruction to the POS agent as such: "Ask the customer, would they buy the handbag (the product), if it came in leather (product attribute)?"

At 226, the calculated instructions are displayed to the POS agent 106, so the agent could present the hypothesis to the customer 102.

At 228, the customer 102 provides it feedback regarding the hypotheses and at 230, the POS agent 106 registers the provided information in the frontend system 102.

At 232, the newly registered feedback data on the hypotheses are transmitted to the backend system 110 for further storage and analysis. For example, regarding the mentioned exemplary hypothesis, the backend system 110 may validate or evaluate the hypothesis according to the received feedback and update the hypothesis.

At 234, the backend system 110 uses the received customer feedback and its analysis to optimize offering related to the target or relevant products or services. For example, the data may be used to generate product or market insights, optimize marketing efforts, optimize affinity models, optimize inventory management tasks, and suggest insights and intelligence to up stream product or service developers such as product or fashion designer, for new and non-existing products or services.

At 236, the backend system 110 provides updates to the POS agent 106 or the customer 104 if necessary. For example, the backend system may communicate directly with the customer, at a later time, if the customer's desired product is available or if backend system 110 determines to present a new hypothesis to the customer.

During the method 200, the customer may be offered with various incentives to motivate the customer for participation in the feedback collection or as part of a marketing promotion.

At 222, in some embodiments, the backend system 110 may generate actions other than generating hypotheses. For example, the processor 112 may identify another POS site and a date that the target product or service would be available for purchase. Or, the processor 112 may suggest a similar product that might be acceptable by the customer (these could be viewed as a hypothesis too, for example, as such: if the customer is offered handbag B, the customer will buy it.)

Figure 3A:
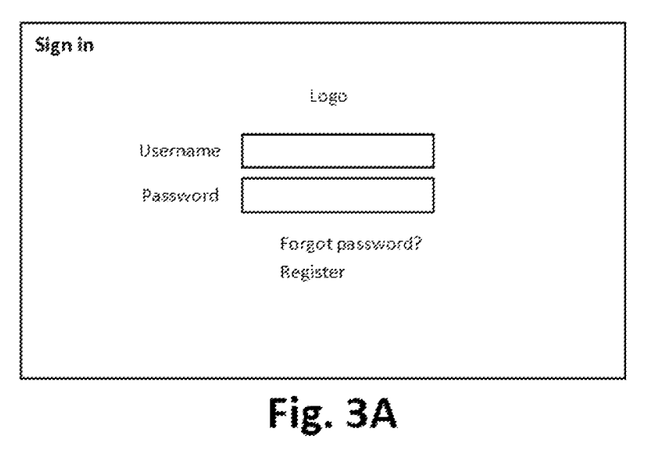
FIG. 3A to 3H are a series of exemplary user interface snapshots showing the displayed interface at the frontend system of FIG. 1.
Figure 3B:
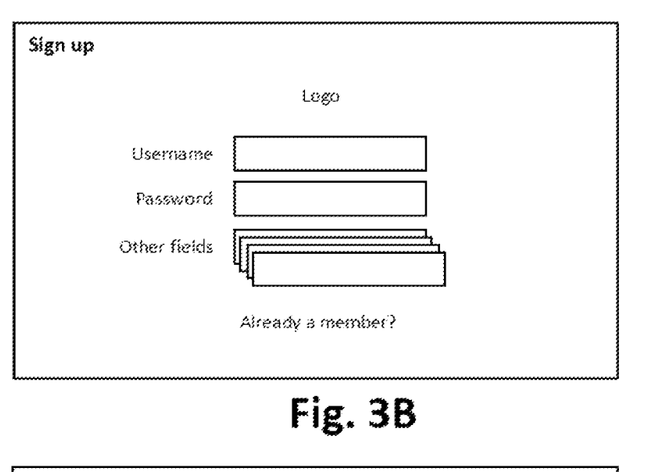

Referring to FIG. 3A to 3H a series of exemplary pages related to an embodiment of the frontend system 102 is illustrated. The purpose of the frontend system 102 is to facilitate interaction and communication of various users, such as the customer 104, the POS agent 106, POS admins and managers (not shown in figures), and product or service analysts, with the backend system. The exemplary pages may be implemented as webpages, pages of a mobile or tablet application, or pages programmed into a human machine interface (HMI), for example. Referring to FIG. 3A, the frontend system 102 may include a sign in page where a user can input its username and password credentials to access their account and log in to an authorized portion of the frontend system 102. If the user does not have an account, they can register for an account. As shown in FIG. 3B, a new user may sign up for an account by selecting a username, a password, and providing further information, such as email address, first and last name, and address, in other fields section.

Figure 3C:
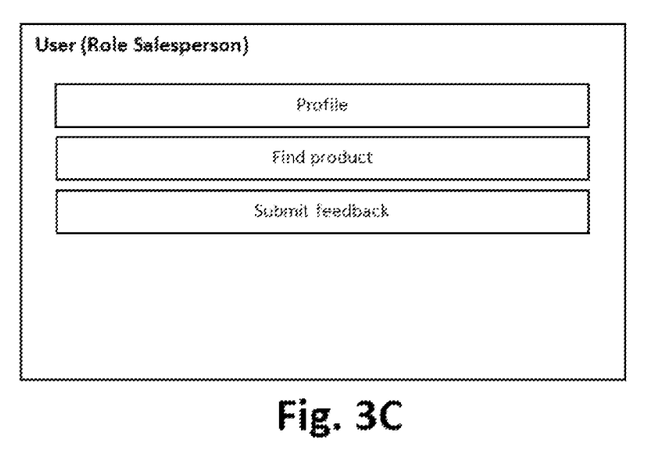
Figure 3D:
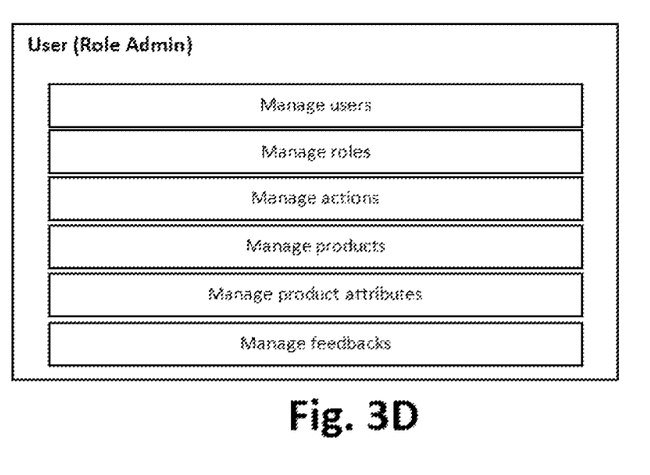

Once logged in, the user may be taken to a particular page corresponding to the role of the user. In FIG. 3C, the user is a salesperson in a POS and has the options to modify their information profile, find a product, or submit feedback. In FIG. 3D, the user is an administrator of the POS or the frontend system 102, The administrator may have access to a wide range of administrative options such as managing users, managing roles, managing actions that could be used in a provided feedback, managing products for which a feedback could be provided, managing attributes that may be associated with a product, and managing feedbacks. The admin may modify settings and configurations regarding each of these options or may observe detailed historical data, such as statistical and insight charts regarding each option.

Figure 3E:
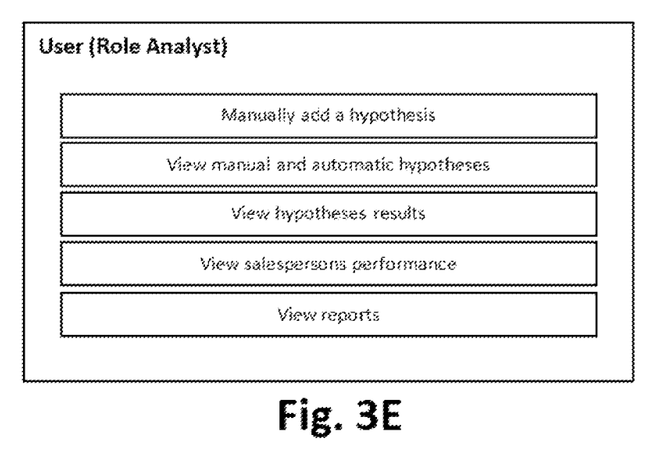

In FIG. 3E, the user is a product or POS analyst who may select options regarding the generated hypothesis by the processor 112, for example, adding a manual hypothesis, viewing the previously added manually or automatically generated hypothesis, and viewing the results and responses to the hypotheses. The analysis may also have access to view the performance of a salesperson, for example, how many feedbacks a salesperson have gathered and how many of them have been resulted in an up selling. Additionally, the analyst may have the option to view and review various reports such as a summary of all feedbacks regarding a particular product or an attribute of a product.

Figure 3F:
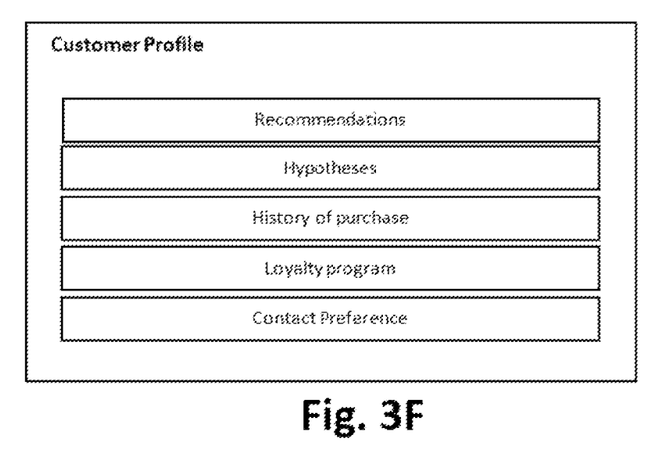

In FIG. 3F, an example of a page related to a customer profile is shown. An admin, Analyst, or salesperson user may get access to a customer profile given obtaining relevant privacy consents. The customer profile may include various information about a particular customer such as recommendations offered to the customer, hypotheses asked from the customer, purchase or transaction history, loyalty programs associated with the customer, and contact preferences identified for the customer.

Figure 3G:
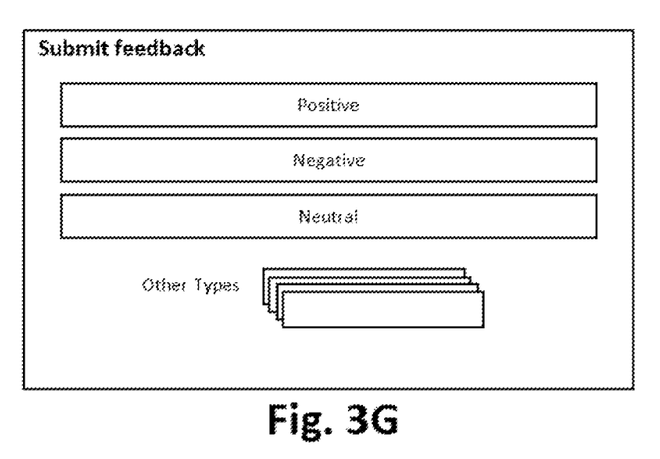
Figure 3H:
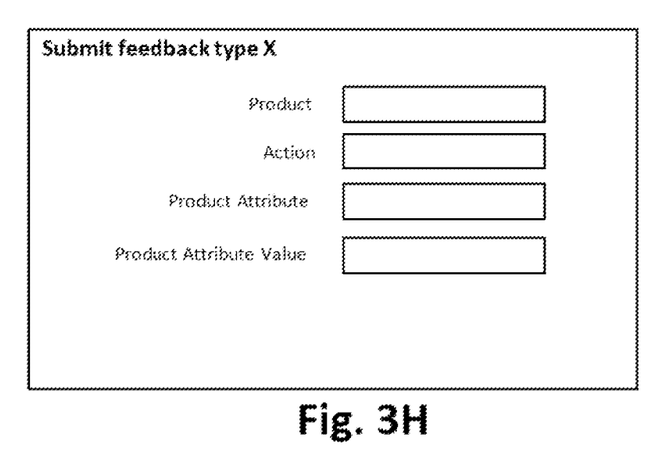

Referring to FIG. 3G, an exemplary page for submitting a feedback regarding a product is provided. The feedback may indicate a positive, negative, or neutral attribution as mentioned in data flow 218 in FIG. 2. The feedback may include other attributions and types such as the those illustrated in FIG. 3H. As shown in FIG. 3H, the feedback may include information about the product, an action, a product attribute, and a product attribute value as the examples under data flow 218 in FIG. 2 suggested.

While specific embodiments have been described and illustrated, such embodiments should be considered illustrative only and not as limiting the disclosed embodiments as construed in accordance with the accompanying claims.

What is claimed is:

1. A system for calculating one or more hypotheses and determining at least one action item using an artificial intelligent ("AI") model, the system comprising:
a frontend system communicatively connected to a backend system and configured to:
collect customer feedback data from a customer regarding at least one attribute of a target product or service via a first user interface, wherein the frontend system receives the customer feedback data and the customer feedback data comprises the at least one attribute and a quality corresponding to the at least one attribute, wherein the frontend system is further configured to:
tailor a visual display of the first user interface to limit data entry for the customer feedback to a set of structured data fields, wherein the set of structured data fields reflect summarized hypotheses data including a product field, a product attribute field, a product attribute value field, and an action field; and
display a first screen of the first user interface tailored to capture respective ones of the set of structured data fields, the first screen configured to limit data entry to the product field, product attribute field, the product attribute value field, and the action field;
transmit the collected customer feedback data including the set of structured data fields to the backend system;
receive the one or more hypotheses from the backend system;
receive a response from the customer based on the one or more hypotheses; and
transmit the response to the backend system;
the backend system comprising a processor and a data system, the data system configured to store system data, wherein the system data comprises data related to a plurality of alternative products or services;
wherein the processor is configured to:
in response to receiving the customer feedback data, calculate the one or more hypotheses defined by a structured data model including the set of structured data fields,
wherein the operation of calculate is performed based on executing one or more operations configured to:
access to the collected customer feedback including the set of structured data fields, and
input the set of structured data fields to the AI model trained to output a hypothesis in response to the input of the set of structured data fields, including the product field, product attribute field, the product attribute value field, and the action field, and
receive the output one or more hypotheses of the AI model, wherein the one or more hypotheses are indicative of a question or action regarding the target product or service based on the customer feedback data, and
transmit the one or more calculated hypotheses to the frontend system to be presented to the customer;
analyzing the response to determine at least one action item to be taken, including validation of the AI model output in response to a positive response and invalidation the AI model output in response to a negative response; and
transmit the at least one action item the frontend system for execution, the at least one action item including automatic identification of new and non-existing inventory.

2. The system of claim 1, wherein the backend system may further comprise one of:
marketing campaign system;
inventory system;
supply chain system; and
customer loyalty system.

3. The system of claim 1 wherein the system may further include a customer database and a customer transaction database.

4. The system of claim 1, wherein the at least one action item comprises one or more of:
optimizing offerings related to the product or service;
generating insight reports about the product or service;
optimizing marketing efforts related to the product or service,
optimizing affinity models related to the product or service; and
optimizing inventory management tasks related to the product or service.

5. The system of claim 1 wherein the frontend system is further configured to transmit a customer identifier to the backend system and thereby causing the backend system to associate the customer feedback data with the customer identifier.

6. The system of claim 1, wherein the AI model is trained to output a hypothesis that specifies criteria for a new product.

7. The system of claim 1, wherein the AI model is trained to output a hypothesis that identifies a missing product from inventory.

8. The system of claim 1, wherein the AI model is trained to identify whether a current product arrangement at a retail location associated with the frontend system matches a consumer demand based, at least in part, on the collected customer feedback consisting of the structured data model.

9. The system of claim 1, wherein the processor is configured to generate probabilistic analysis of the set of structured data fields and return action information and a predicted probability of an action associated with the action information occurring.

10. The system of claim 9, wherein the processor is configured to communicate the set of structured data fields to an AI model trained to output a probability of the action in response to input of the structured data fields.

11. The system of claim 1, wherein the processor is configured to trigger a feedback loop to update process for generating the one or more hypotheses.

12. The system of claim 1, wherein the processor is configured to update an AI model trained to output a hypothesis based on feedback received on the set of structured data fields.

13. The system of claim 1, wherein the backend system is configured to generate a direct communication channel with a user.

14. The system of claim 13, wherein the backend system is configured to solicit feedback from the user via the direct communication channel and update an AI model based on received feedback.

15. The system of claim 14, wherein backend system is configured to evaluate or validate an updated hypothesis generated subsequent to updating the AI model via the direct communication channel.

16. The system of claim 1, wherein the system is configured to generate and display the first screen of interface wherein the first screen of the user interface is limited to display options for data fields associated with the structured data model comprising a group of at most four data fields.

17. The system of claim 1, wherein the operation to transmit the one or more calculated hypotheses to the frontend system to be presented to the customer is encoded under the structured data model reflecting the set of structure data fields.

18. The system of claim 1, wherein the at least one action item comprises at least one change to a point-of-sale site wherein the point-of-sale site is one or more of a point-of-sale location or at least one secondary point-of-sale location.

* * * * *